US010550900B2

(12) United States Patent
Ono et al.

(10) Patent No.: US 10,550,900 B2
(45) Date of Patent: Feb. 4, 2020

(54) CLUTCH ENGAGEMENT CONTROL SYSTEM

(71) Applicant: HONDA MOTOR CO., LTD., Tokyo (JP)

(72) Inventors: Junya Ono, Wako (JP); Tatsuya Ryuzaki, Wako (JP)

(73) Assignee: HONDA MOTOR CO. LTD., Tokyo (JP)

( * ) Notice: Subject to any disclaimer, the term of this patent is extended or adjusted under 35 U.S.C. 154(b) by 532 days.

(21) Appl. No.: 15/448,087

(22) Filed: Mar. 2, 2017

(65) Prior Publication Data
US 2017/0284483 A1    Oct. 5, 2017

(30) Foreign Application Priority Data

Mar. 30, 2016 (JP) ................................ 2016-069438

(51) Int. Cl.
 F16D 48/06    (2006.01)
 F16H 63/46    (2006.01)
(52) U.S. Cl.
 CPC ............. *F16D 48/06* (2013.01); *F16H 63/46* (2013.01); *F16D 2500/1045* (2013.01); *F16D 2500/10412* (2013.01); *F16D 2500/30406* (2013.01); *F16D 2500/30415* (2013.01);
(Continued)
(58) Field of Classification Search
 CPC ... F16D 2500/10412; F16D 2500/1045; F16D 2500/30406; F16D 2500/30415; F16D 2500/30426; F16D 2500/3067; F16D 2500/30806; F16D 2500/30816; F16D 2500/30825; F16D 2500/3109; F16D 2500/50669; F16D 2500/7041; F16D 2500/70488; F16D 48/06; F16H 63/46
 See application file for complete search history.

(56) References Cited

U.S. PATENT DOCUMENTS

2006/0212204 A1*  9/2006  Honma ................... F16D 48/06
                                                     701/67
2014/0142823 A1*  5/2014  Terashima ............. F16H 61/02
                                                     701/58
(Continued)

FOREIGN PATENT DOCUMENTS

JP            5025486         6/2012

*Primary Examiner* — Jacob S. Scott
(74) *Attorney, Agent, or Firm* — Rankin, Hill & Clark LLP

(57) ABSTRACT

In a dutch engagement control system for engagement and disengagement of transmission of a rotational force between a mainshaft and a countershaft, when clutch engagement control is executed based on the determination that rotational speeds of both the shafts agree with each other, even if unexpected variations in countershaft rotational speed result from torsion occurring downstream of the countershaft in a drive system and/or the like, smooth engagement control is implemented. A control value of countershaft rotational speed at each time is updated and managed. If a threshold value is exceeded by a difference between a countershaft rotational speed actual measured value and the preceding control value, the threshold value is added to the preceding value to obtain the control value. If the threshold value does not exceed the difference, the actual measured value at this time is set as a control value without any change.

7 Claims, 9 Drawing Sheets

(52) U.S. Cl.
CPC ............ *F16D 2500/30426* (2013.01); *F16D 2500/30806* (2013.01); *F16D 2500/3109* (2013.01)

(56) References Cited

U.S. PATENT DOCUMENTS

2017/0138421 A1* 5/2017 Cho .................. F16D 48/08
2017/0146078 A1* 5/2017 No .................... F16D 48/08

* cited by examiner

CLUTCH ENGAGEMENT CONTROL SYSTEM

TECHNICAL FIELD

The present invention relates to a clutch engagement control system for engagement and disengagement of transmission of a rotating force between a mainshaft and a countershaft and, more particularly, to a clutch engagement control system capable of achieving smooth engagement control even if unexpected variations in rotational speed of the countershaft result from torsion occurring downstream of the countershaft in a drive system and/or the like when the clutch engagement control is executed based on the determination that rotational speeds of the mainshaft and the countershaft agree with each other.

BACKGROUND ART

Patent Literature 1 discloses a clutch engagement control system for engagement and disengagement of transmission of a rotating force between the mainshaft (first shaft) and the countershaft (second shaft). In the clutch engagement control system, for a gear shift and/or the like, the rotational speed of the first shaft and the rotational speed of the second shaft are compared. Then, when the two rotational speeds have become approximately equal, it is determined that the clutch engagement is approximately completed, and then the clutch engagement state is controlled for further transition in order to complete the clutch engagement after the gear shift.

CITATION LIST

Patent Literatures

Patent Literature 1: JP Patent No. 5025486

SUMMARY OF INVENTION

Technical Problem

However, the above conventional techniques have a problem to be incapable of handling the following events. Specifically, in some cases, instantaneous variations in rotational speed of the second shaft may result from torsions occurring downstream from the second shaft in the drive system leading to the final axle, and/or the like. Because such instantaneous variations are less than original stable rotational speeds of the second shaft, in the conventional techniques such instantneous variations result in impossibility of achieving smooth clutch engagement if the decision to complete the clutch engagement is made and the control is performed when rotational speeds have become approximately equal between the first shaft and the second shaft.

FIG. 2 is a representation showing a schematic example for describing a problem in the conventional techniques. FIG. 2 shows an instance as a time-line chart of each parameter in a shift operation, the instance being where, for example, in an upshift from second gear to third gear, instantaneous variations in rotational speed of the second shaft makes a smooth clutch engagement impossible. Solid line L1 shown in [1] is a graph of engine rotational speed, dotted line L2 is a graph of rotational speed of the first shaft and dot-dash line L3 is a graph of rotational speed of the second shaft. Solid line L4 shown in [2] is a graph of an angle of a spindle changed in step with the shift operation, and dotted line L5 is a graph of an angle of a shift drum. Solid line L6 shown in [3] is a graph of propeller torque (drive torque applied to a propeller shaft).

The above [1] to [3] of FIG. 2 are graphs with common time axial direction as shown by common times t11 to t14. Time t11 is a time at which a second-to-third gear upshift instruction is received. Time t12 is a time at which the shift spindle is rotated to reach the full disengagement position after the instruction has been received. Time t13 is a time at which it is determined that rotational speeds of the first shaft and the second shaft have agreed with each other. And, time t14 is a time at which the clutch engagement is completed.

Specifically, while the clutch engagement control system is increasing the clutch capacity in a half clutch state from time t12 to time t13, the clutch engagement control system is on standby until it is decided that rotational speeds of the first shaft and the second shaft agree with each other. Then, as shown by arrow A1 in [1], the agreement decision is made at time t13. However, as seen from a steep increase in rotational speed of the second shaft shown by line L3 within a short time before time t13, the rotational speed of the second shaft used in the agreement decision at time t13 is a sudden rotational speed resulting from torsion occurring downstream and/or the like, and therefore, the rotational speed of the second shaft has an unexpectedly higher value than that of an original stable rotational speed.

Therefore, if, at time t13, the control proceeds to control for completing the clutch engagement, the clutch will be engaged although there is a difference between the rotational speed of the first shaft and the rotational speed of the second shaft as shown by lines L2, L3 immediately after time t13. Because of this, the propeller torque shown by line L6 rises suddenly at a point (around time t14) shown by arrow A2, and this makes the occupant feel uncomfortable. In this manner, in the event of instantaneous variations in rotational speed of the second shaft, smooth clutch engagement as shown by dotted line L7 cannot be achieved by the conventional techniques.

It is noted that, in [1] of FIG. 2, each rotational speed shown by lines L1, L2, L3 is presented by being normalized with reference to engine rotational speed shown by line L1 for the purpose of easy comparison with one another. Specifically, the rotational speed of the first shaft shown by line L2 and the rotational speed of the second shaft shown by line L3 are presented by being converted to engine rotational speed with consideration given to a reduction ratio. A momentary change in rotational speed of the second shaft shown by line L3 occurs at time t11. This is because a reduction ratio for the conversion is changed upon reception of a shift instruction.

It is an object of the present invention to address the problem of the conventional techniques and to provide a clutch engagement control system capable of achieving smooth engagement control even if unexpected variations in rotational speed of a countershaft result from torsion occurring downstream of the second shaft (countershaft) in a drive system and/or the like.

Solution to Problems

To achieve the afore-mentioned object, the present invention has a first feature in that a clutch engagement control system (100) controlling a shift clutch (53) in a vehicle (1) comprising a transmission (TM) and the shift clutch (53), the transmission (TM) being arranged between an engine (E) and a drive wheel (WR), the shift clutch (53) being arranged between the engine (E) and the transmission (TM) to engage and disengage transmission of a rotational drive force between a first shaft (42, 52) on the engine (E) side and a second shaft (54) on the drive wheel (WR) side, wherein the clutch engagement control system (100) includes: a second rotational speed detector (144) detecting a second shaft rotational speed (CTR(i)); and a control rotational speed calculation unit (121) for setting a control value (CTC(i)) of the second shaft rotational speed (CTR(i)) without exceeding a predetermined upper limit when a change of the detected second shaft rotational speed (CTR(i)) exceeds the predetermined upper limit, and for setting the detected value of the second shaft rotational speed (CTR(i)) as the control value (CTC(i)) of the second shaft rotational speed (CTR(i)) when the change of the detected second shaft rotational speed (CTR(i)) does not exceed the predetermined upper limit, and the shift clutch (53) is controlled based on the set control value (CTC(i)) of the second shaft rotational speed (CTR(i)).

The present invention has a second feature in that the control rotational speed calculation unit (121) sets the control value (CTC(i)) of the second shaft rotational speed (CTR(i)) at each time point (i) in order to update the control value (CTC(i)) of the second shaft rotational speed (CTR(i)) at each time point (i), when a predetermined value is exceeded by a difference between the second shaft rotational speed (CTR(i)) detected at a current time point (i) and a control value (CTC(i−1)) of the second shaft rotational speed (CTR(i)) updated at a preceding time point (i−1) preceding the current time point (i), the control rotational speed calculation unit (121) adds the predetermined value to the control value (CTC(i−1)) of the second shaft rotational speed (CTR(i)) updated at the preceding time point (i−1), and then the control rotational speed calculation unit (121) assumes a sum of the addition to be the control value (CTC(i)) of the second shaft rotational speed (CTR(i)) updated at the current time point (i), and when the predetermined value is not exceeded by the difference, the control rotational speed calculation unit (121) assumes the value of the second shaft rotational speed (CTR(i)) detected at the current time point (i) to be the control value (CTC(i)) of the second shaft rotational speed (CTR(i)) updated at the current time point (i).

The present invention has a third feature in that the clutch engagement control system further comprises a first rotational speed detector (143) detecting rotational speed (Ne) of the first shaft (42), wherein, when it is determined that the detected rotational speed (Ne) of the first shaft (42) and the updated control value (CTC(i)) of the second shaft rotational speed (CTR(i)) agree with each other in consideration of a reduction ratio between the first shaft (42) and the second shaft (54), it is determined that a predetermined half clutch state is converged in the shift clutch (53), and therefore transition of the clutch engagement state to a next state is controlled.

The present invention has a fourth feature in that the predetermined value is a value in relation to a gear position set at the current time point (i) in the transmission (TM).

The present invention has a fifth feature in that the upper limit is set in relation to a predetermined upper-limit acceleration of the vehicle (1).

Advantageous Effects of Invention

According to the first feature, a clutch engagement control system (100) controlling a shift clutch (53) in a vehicle (1) comprising a transmission (TM) and the shift clutch (53), the transmission (TM) being arranged between an engine (E) and a drive wheel (WR), the shift clutch (53) being arranged between the engine (E) and the transmission (TM) to engage and disengage transmission of a rotational drive force between a first shaft (42, 52) on the engine (E) side and a second shaft (54) on the drive wheel (WR) side, wherein the clutch engagement control system (100) includes: a second rotational speed detector (144) detecting a second shaft rotational speed (CTR(i)); and a control rotational speed calculation unit (121) for setting a control value (CTC(i)) of the second shaft rotational speed (CTR(i)) without exceeding a predetermined upper limit when a change of the detected second shaft rotational speed (CTR(i)) exceeds the predetermined upper limit, and for setting the detected value of the second shaft rotational speed (CTR(i)) as the control value (CTC(i)) of the second shaft rotational speed (CTR(i)) when the change of the detected second shaft rotational speed (CTR(i)) does not exceed the predetermined upper limit, and the shift clutch (53) is controlled based on the set control value (CTC(i)) of the second shaft rotational speed (CTR(i)).

Therefore, when a change in rotational speed detected by the second rotational speed detector exceeds a predetermined upper limit, the detected rotational speed can be assumed to be a momentary change due to torsion in the drive system and/or the like, rather than an original value. Therefore, the clutch engagement is controlled based on a rotational speed value for control which is set so as not to exceed the predetermined upper limit. As a result, smooth engagement control is achieved.

According to the second feature, the control rotational speed calculation unit (121) sets the control value (CTC(i)) of the second shaft rotational speed (CTR(i)) at each time point (i) in order to update the control value (CTC(i)) of the second shaft rotational speed (CTR(i)) at each time point (i), when a predetermined value is exceeded by a difference between the second shaft rotational speed (CTR(i)) detected at a current time point (i) and a control value (CTC(i−1)) of the second shaft rotational speed (CTR(i)) updated at a preceding time point (i−1) preceding the current time point (i), the control rotational speed calculation unit (121) adds the predetermined value to the control value (CTC(i−1)) of the second shaft rotational speed (CTR(i)) updated at the preceding time point (i−1), and then the control rotational speed calculation unit (121) assumes a sum of the addition to be the control value (CTC(i)) of the second shaft rotational speed (CTR(i)) updated at the current time point (i), and when the predetermined value is not exceeded by the difference, the control rotational speed calculation unit (121) assumes the value of the second shaft rotational speed (CTR(i)) detected at the current time point (i) to be the control value (CTC(i)) of the second shaft rotational speed (CTR(i)) updated at the current time point (i).

Therefore, a determination on whether a predetermined value is exceeded or not makes it possible to find a control value of the second shaft rotational speed with accuracy.

According to the third feature, the clutch engagement control system further comprises a first rotational speed detector (143) detecting rotational speed (Ne) of the first shaft (42), wherein, when it is determined that the detected rotational speed (Ne) of the first shaft (42) and the updated control value (CTC(i)) of the second shaft rotational speed (CTR(i)) agree with each other in consideration of a reduction ratio between the first shaft (42) and the second shaft (54), it is determined that a predetermined half clutch state is converged in the shift clutch (53), and therefore transition of the clutch engagement state to a next state is controlled.

Therefore, for the convergence determination, an agreement between rotational speed of the first shaft and rotational speed of the second shaft is determined with accuracy. This makes smooth clutch engagement possible.

According to the fourth feature, the predetermined value is a value in relation to a gear position set at the current time point (i) in the transmission (TM).

Therefore, a control value of the second shaft rotational speed is able to be found with accuracy by setting the predetermined value reflective of a momentary change caused by torsion in the drive system and/or the like, the change varying in size according to gear positions.

According to the fifth feature, the upper limit is set in relation to a predetermined upper-limit acceleration of the vehicle (1).

Therefore, a control value of the second shaft rotational speed is able to be found with accuracy by setting the predetermined upper limit in relation to a upper-limit acceleration of the vehicle.

DESCRIPTION OF EMBODIMENTS

Figure 1:
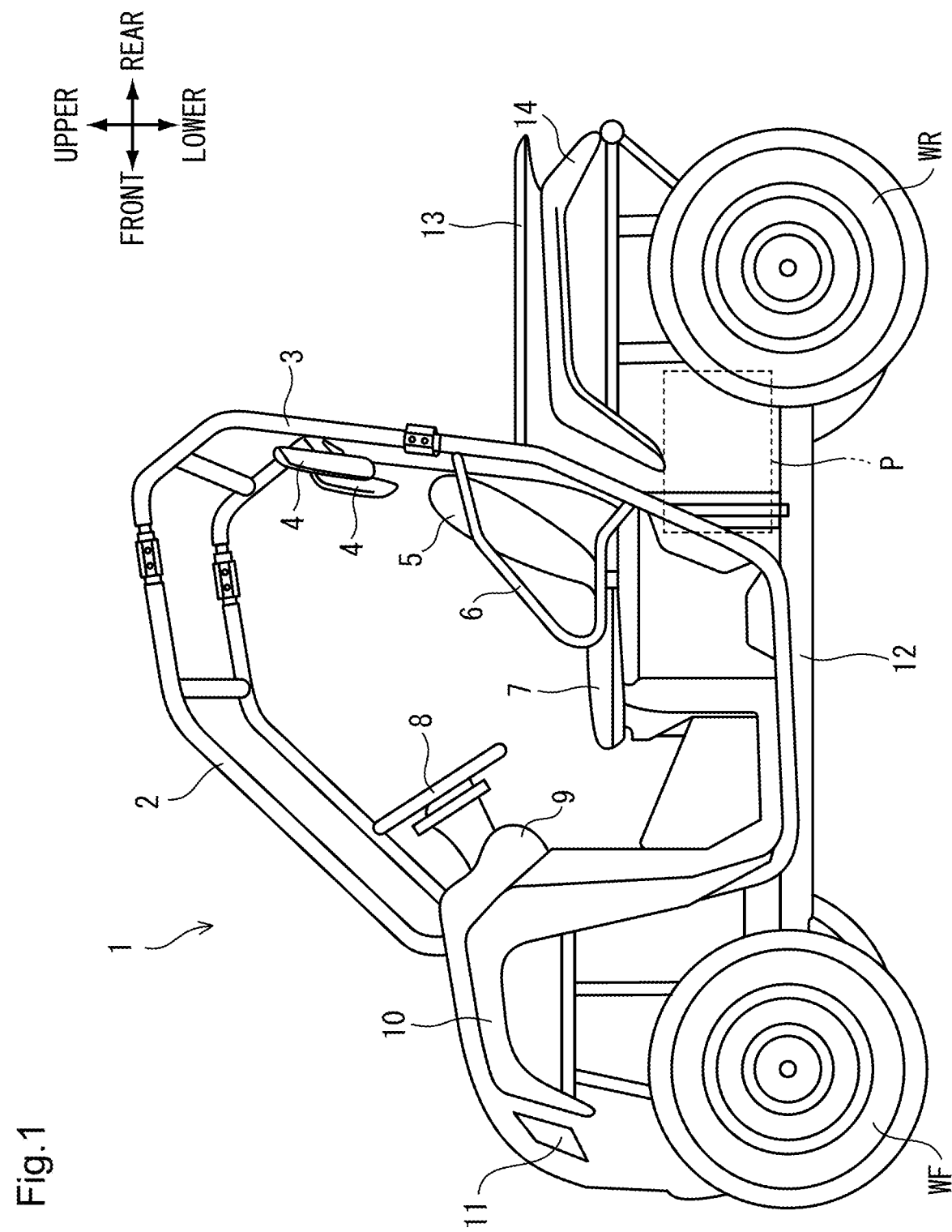
FIG. 1 is a left side view of an MUV (multi-utility vehicle) vehicle to which a clutch engagement control system in accordance with one embodiment has been applied.

Now, a preferred embodiment of the present invention will be described below with reference to the drawings. FIG. 1 is a left side view of an MUV (multi-utility vehicle) vehicle 1 to which a clutch engagement control system in accordance with one embodiment has been applied. The MUV vehicle 1 is a multipurpose four-wheel vehicle in which a pair of left and right front wheels WF and a pair of left and right rear wheels WR are rotatably journaled to a body frame 12, and a driving force is supplied to either or both of the front wheels and the rear wheels from a transmission-integrated power unit P disposed at a lower portion in a rather rear position of a vehicle body, whereby the vehicle is made to run.

A riding space for two persons is surrounded by a pair of left and right front roll bars 2 and a pair of left and right rear roll bars 3, and the riding space is provided upward of a front portion of the power unit P. Seating portions 7 and backrest portions 5 are provided in left-right pairs. Headrests 4 and occupant guard members 6 are attached to the rear roll bars 3. In front of an instrument panel 9 to which a steering wheel 8 is attached, fenders 10 for the front wheels WF are mounted. A pair of left and right headlamps 11 is disposed at front portions of the vehicle body. Fenders 14 for the rear wheels WR are mounted in a location rearward and upward of the power unit P, and a rear carrier 13 is attached to upper portions of the fenders 14.

The power unit P according to the embodiment is configured so that a shift of a staged transmission and engagement/disengagement of a shift clutch can be performed in an interlocked manner by an electric actuator. This ensures that shift operations during running can be effected by only operating a shift-up switch and a shift-down switch which are provided in the vicinity of the steering wheel 8.

Figure 3:
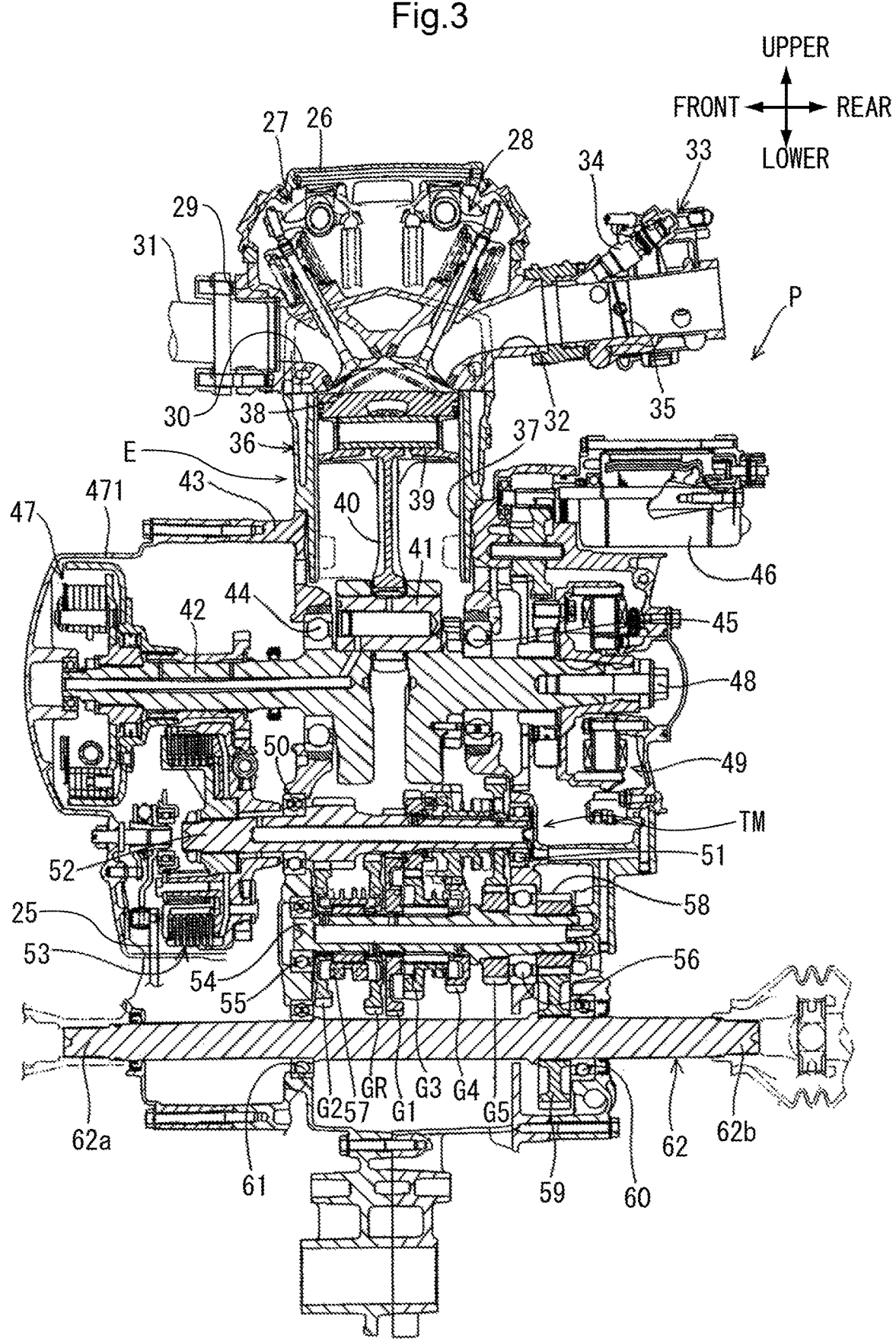
FIG. 3 is a sectional view of the power unit P to which the clutch engagement control system in accordance with one embodiment is applied.

FIG. 3 is a sectional view of the power unit P to which the clutch engagement control system in accordance with one embodiment is applied. The four directional arrows shown in the drawing indicate the directions of the vehicle equipped with the power unit P.

The power unit P has a single-cylinder four-cycle engine E and an electric-change type multistage transmission TM with five-forward and one-reverse gears. The power unit P is provided with a start clutch 47 and a shift clutch 53 between a crankshaft 42 and the transmission TM. The start clutch 47 is composed of a centrifugal clutch which does not transfer a drive force until the engine rotational speed Ne exceeds a predetermined value. The shift clutch 53 engages/disengages the driving-force transmission in response to the operation of a shift mechanism C (see FIG. 4) driven by a shift motor 78. In this way, the start and shift operations are enabled without the necessity of manual clutch operation. The shift clutch 53 is connected to a clutch operation arm 25 to operate the engagement/disengagement of the shift clutch 53 in response to the operation of the shift mechanism C. In other words, the power unit P is configured to use the shift motor 78 to perform shifting of the transmission TM and engagement/disengagement of the shift clutch 53 in an interlocked manner.

A piston 38 is slidably housed in a sleeve 37 embedded in a cylinder block 36 of the engine E. The piston 38 is journaled at one end of a connecting rod 40 via a piston pin 39. The connecting rod 40 has the other end journaled to the crankshaft 42 via a crankpin 41. A cylinder head 29 is mounted on the upper portion of the cylinder block 36, and the cylinder head 29 houses an intake valve mechanism 28 and an exhaust valve mechanism 27.

An injector 34 of a fuel injection device and a throttle body 33 having a throttle valve 35 are mounted on the upstream side of an intake port 32 of the cylinder head 29. On the other hand, an exhaust pipe 31 coupled to a muffler is mounted on the downstream side of an exhaust port 30. A cylinder head cover 26 is mounted above a rocker arm for driving intake and exhaust valves.

The crankshaft 42 is journaled by bearings 44, 45 placed in a crankcase 43. An AC generator 49 is secured to a right end portion, in the figure, of the crankshaft 42 with a bolt 48. The power of a starter motor 46 is transmitted to the crankshaft 42 via a gear located between the bearing 45 and the AC generator 49.

A clutch cover 471 is installed on the left, in the figure, of the crankcase 43. The start clutch 47 is mounted to the left end, in the figure, of the crankshaft 42. When the crankshaft 42 exceeds predetermined turning, the start clutch 47 transmits the rotational power to a mainshaft 52 of the transmission. The power is input to the mainshaft 52 journaled by the bearings 50, 51 and then the power is reduced in speed by a shift gear pair installed between the mainshaft 52 and a countershaft 54.

A second driven gear G2, a reverse driven gear GR, a first driven gear G1, a third driven gear G3, a fourth driven gear G4 and a fifth driven gear G5 are arranged, in order from the left in the figure, on the counter shaft 54 which is journaled by bearings 55, 56. The shift gear pairs for transmission of power are configured to be switched in response to the operation of an axially slidable shift sleeve 57, and the like.

Then, after the power has been reduced in speed by a given shift gear pair, the power is transmitted from a drive side output gear 58 via a driven side output gear 59 to a final output shaft 62 which is rotatably journaled by bearings 60, 61. The drive side output gear 58 is attached to the right end, in the figure, of the counter shaft 54. A front end 62a of the final output shaft 62 is coupled to a front propeller shaft of the vehicle, while a rear end 62b of the final output shaft 62 is coupled to a rear propeller shaft.

Figure 4:
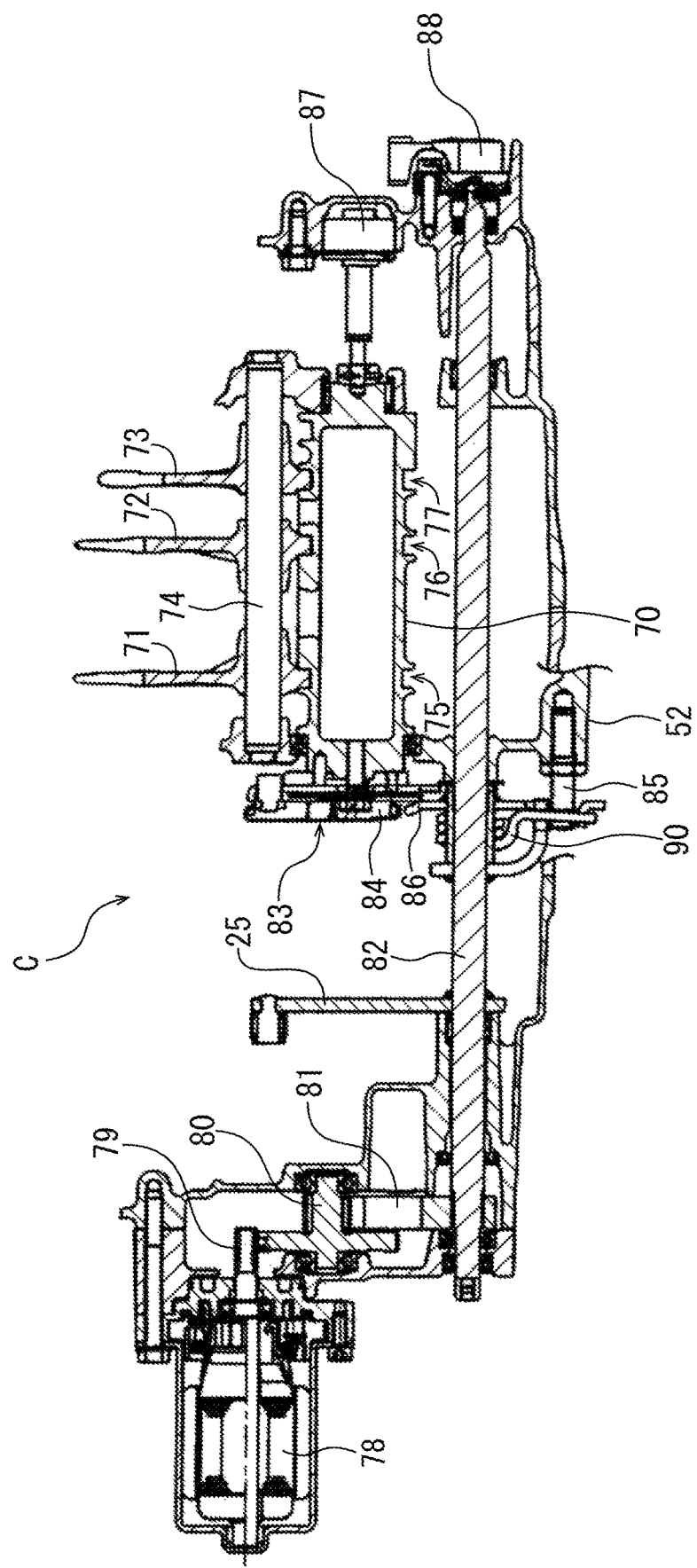
FIG. 4 is a sectional view of a shift mechanism of a transmission.

FIG. 4 is a sectional view of the shift mechanism C of the transmission TM. A hollow-cylindrical shift drum 70 is journaled to be rotatable relative to the crankcase 43. The shift drum 70 is disposed parallel to the axial direction of the power transmission system T. Shift forks 71, 72, 73 for rotational movement of the shift drum 70 are supported to be axially slidable relative to a fork shaft 74. Lead grooves 75, 76, 77 are formed on the outer peripheral surface of the shift drum 70 to be engaged with cylindrical-column shaped protrusions, the protrusions being respectively formed on the bottom ends of the shift forks 71, 72, 73. Thus, upon rotational movement of the shift drum 70, the leading ends of the three shift forks make a change to a meshing state of a dog clutch which is placed between adjacent gears in the gear train G1-G5, GR.

Figure 5:
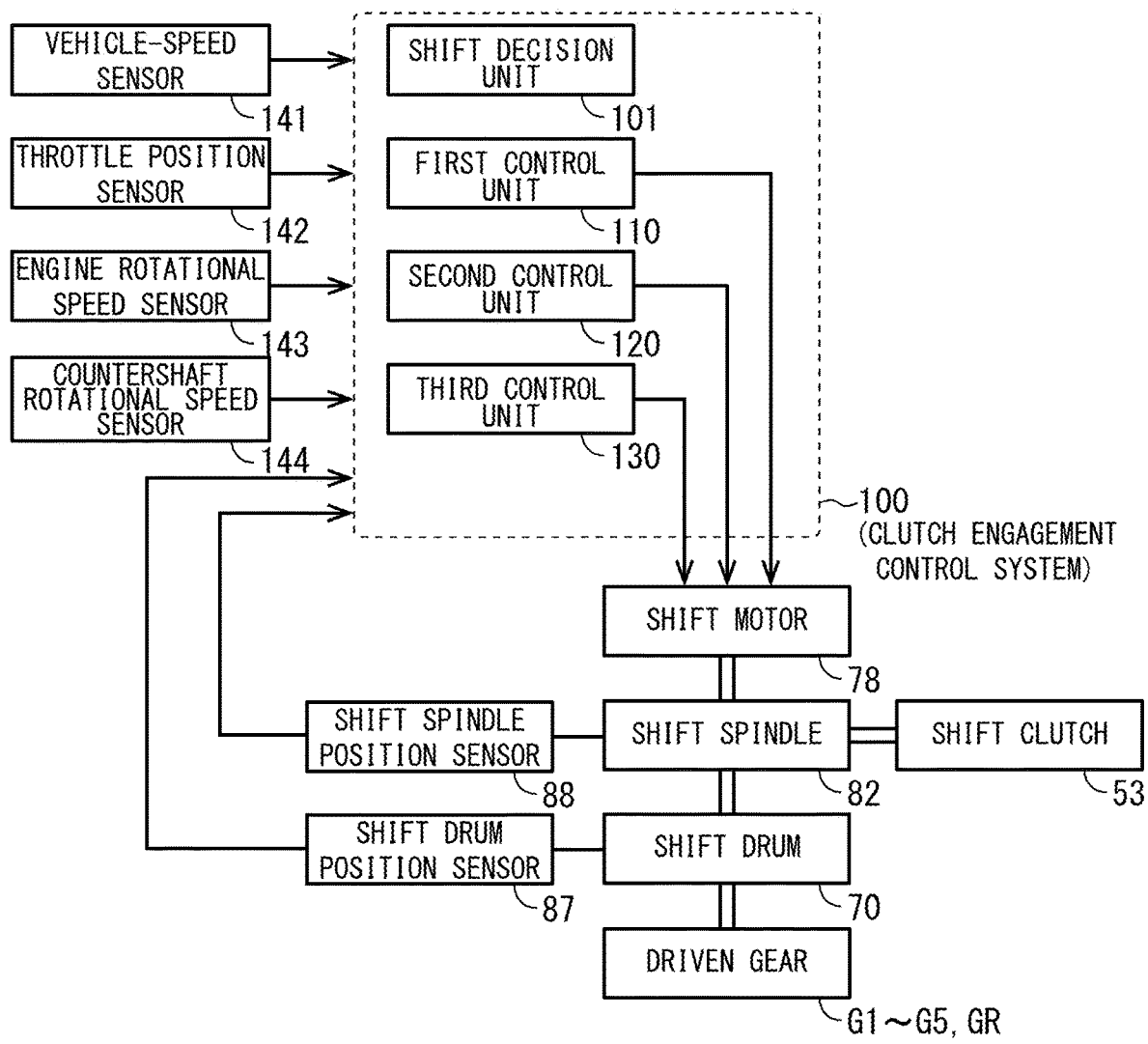
FIG. 5 is a function block diagram of the clutch engagement control system in accordance with one embodiment.

The rotation operation of the shift drum 70 is caused by the shift motor 78 which is driven under control of a clutch engagement control system 100 (see FIG. 5). The rotational drive force of the shift motor 78 is transferred from an output shaft 79 to a shift spindle 82 through an intermediate gear 80 and a fan-shaped gear 81. A plate-shaped shift arm 86 is journaled to the shift spindle 82, so that, upon rotation of the shift arm 86 by a predetermined angle in the forward and reverse directions to make one round trip, the shift drum 70 is structured to rotate by a predetermined angle in one direction via a change delivering mechanism 83.

Further, the clutch operation arm 25 for operation of the shift clutch 53 (see FIG. 3) is secured to the shift spindle 82. Thus, the shift clutch 53 is driven in the disengagement direction upon rotational movement of the shift spindle 82, and the shift clutch 53 is driven in the engagement direction in response to the operation of the shift spindle 82 when the shift spindle 82 returns to the initial position.

A drum center 84 is non-rotatably secured to the shift drum 70, and the drum center 84 has a function of causing restraint to the switching operation of the shift drum 70 to a predetermined rotation position. A return spring 90 is engaged between the shift spindle 82 and a guide pin 85 in order to give a biasing force to move the shift arm 86 back to the initial position.

A shift drum position sensor 87 is mounted to the right end of the shift drum 70 as illustrated in the figure. The shift drum position sensor 87 serves as a rotational angle detection switch for detecting a current shift position on the basis of the rotation position of the shift drum 70. A shift spindle position sensor 88 serving as a rotational angle sensor is mounted to the right end of the shift spindle 82.

FIG. 5 is a function block diagram of the clutch engagement control system 100 in accordance with one embodiment. The clutch engagement control system 100 includes a shift decision unit 101, a first control unit 110, a second control unit 120 and a third control unit 130. Upon automatic decision made at the shift decision unit 101 or upon reception of operation of the shift-up switch and the shift-down switch by the occupant, the first to third control units 110, 120, 130 control, in order, driving of the shift motor 78 to cause the transmission TM to perform the shift operation in response to the clutch engagement control. Initially, the first control unit 110 controls movement of the spindle position from a neutral position to a full disengagement position, and then the second control unit 120 controls movement of the spindle position from the full disengagement position to a position corresponding to a middle capacity of the shift clutch. And the second control unit 120 makes, at the middle-capacity position, a clutch engagement determination. Finally, the third control unit 130 controls movement of the spindle position from the middle-capacity position to the neutral position to complete the shift operation.

The clutch engagement control system 100 receives input signals used in the control, the input signals indicating a vehicle speed detected by a vehicle-speed sensor 141, the degree of throttle opening detected by a throttle position sensor 142, an engine rotational speed detected by an engine rotational speed sensor 143, a rotational speed of the countershaft detected by a countershaft rotational speed sensor 144, a shift drum position detected by the shift drum position sensor 87 as a predetermined rotation position corresponding to a predetermined shift position, and a spindle position detected by the shift spindle position sensor 88.

Figure 6:
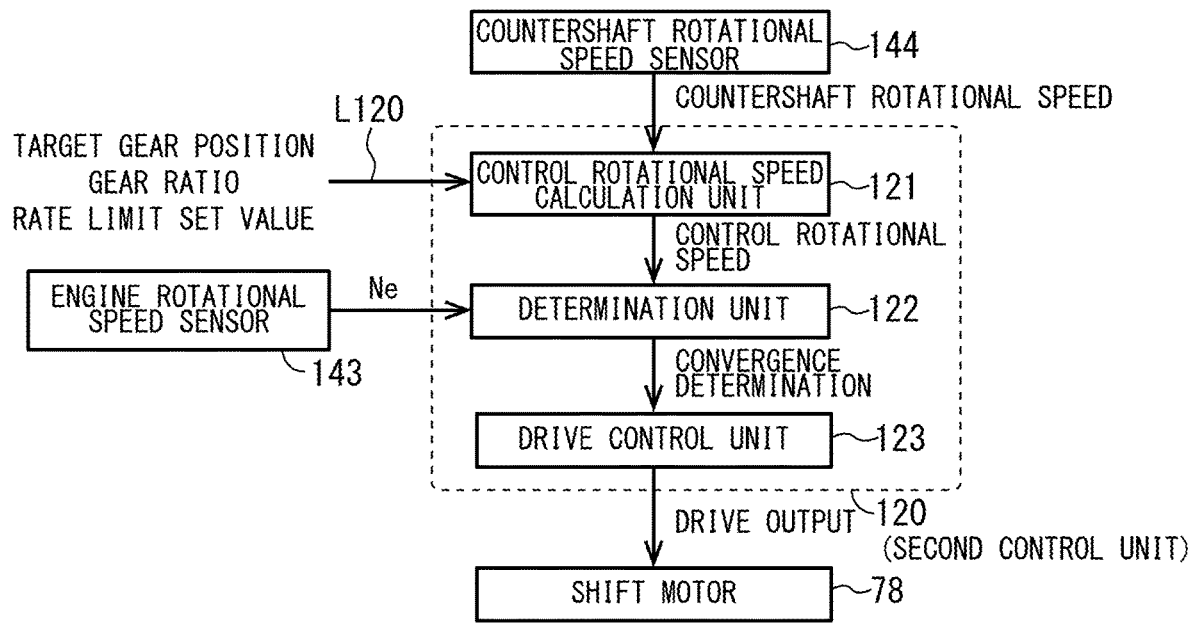
FIG. 6 is a function block diagram about principal functions of a second control unit in accordance with one embodiment.

FIG. 6 is a function block diagram about principal functions of the second control unit 120 in accordance with one embodiment. The second control unit 120 includes a control rotational speed calculation unit 121, a determination unit 122 and a drive control unit 123.

The control rotational speed calculation unit 121 monitors the countershaft rotational speed CTR(i) as an actual measured value at each time i(i=1, 2, . . . ) detected by the countershaft rotational speed sensor 144. Then, the control rotational speed calculation unit 121 uses a target gear position in the shift operation, a gear ratio for the target gear position, and a later-described rate limit set value, as shown by line L120 in the figure, in order that, if it is estimated that the actual measured rotational speed CTR(i) is affected by unexpected variations in rotational speed which result from torsion on the downstream side and/or the like, rotational speed cleared of this effect is set as a control rotational speed CTC(i) used for the clutch engagement control, and then the control rotational speed calculation unit 121 outputs the control rotational speed CTC(i) to the determination unit 122. Details of the calculation of the control rotational speed CTC(i) will be described later with reference to FIG. 8. On the other hand, if it is estimated that the actual measured rotational speed CTR(i) is not affected by unexpected variations in rotational speed, the control rotational speed calculation unit 121 adopts the value of the actual measured rotational speed CTR(i) obtained from the countershaft rotational speed sensor 144, as a control rotational speed CTC(i) without any change, and then the control rotational speed calculation unit 121 outputs the control rotational speed CTC(i) to the determination unit 122.

The determination unit 122 makes a comparison between the control rotational speed CTC(i) obtained from the control rotational speed calculation unit 121 and the engine rotational speed Ne(i) at the time i obtained from the engine rotational speed sensor 143 in order to determine whether or not the clutch engagement has been completed in the middle-capacity position (details will be described later with reference to FIG. 8). And then the determination unit 122 outputs the determination result to the drive control unit 123. The drive control unit 123 continues to control driving of the shift motor 78 for movement to the middle-capacity position as a target position, until the instant when the completion determination is obtained from the determination unit 122.

Figure 7:
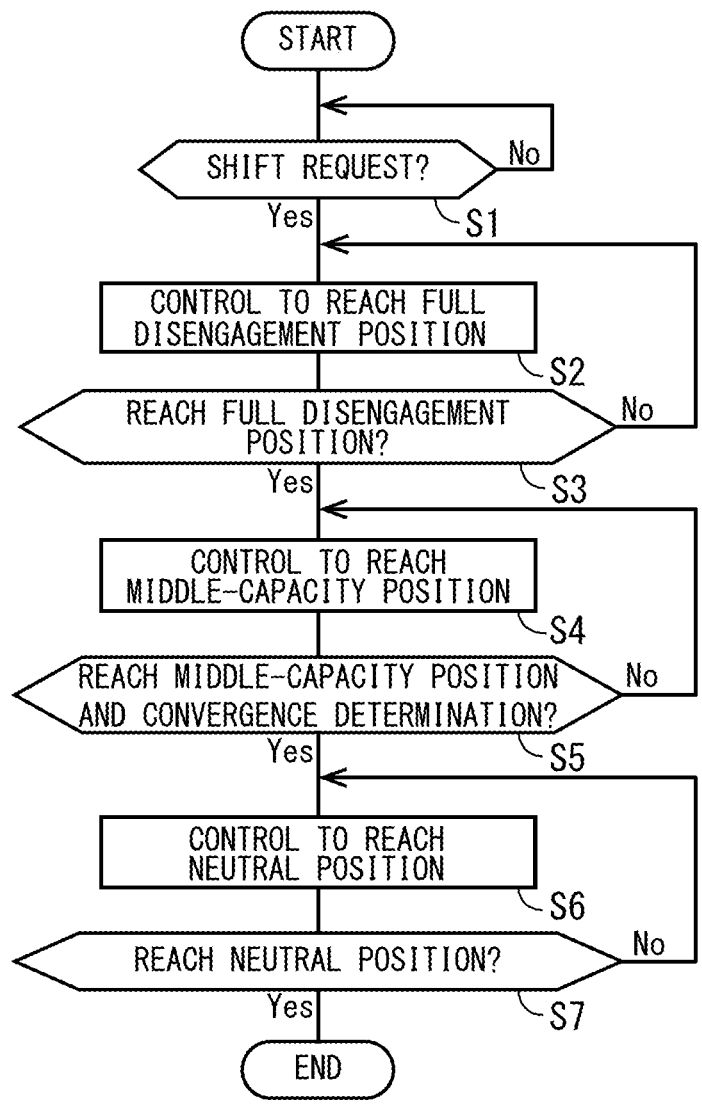
FIG. 7 is a flowchart of the operation of the clutch engagement control system in accordance with one embodiment.

FIG. 7 is a flowchart of the operation of the clutch engagement control system 100 in accordance with one embodiment. At step S1, it is determined whether or not a shift request comes in. If the shift request comes in, a target position for the spindle position is set to a full disengagement position, and then the flow goes to step S2. If any shift request does not come in, the flow goes back to step S1 to be on standby at step S1 until a shift request comes in. The determination as to the presence or absence of the shift request may be made by the presence or absence of the operation of the upshift switch and the downshift switch by the occupant, the upshift and downshift switches being installed near the steering wheel 8. In addition to this, in one embodiment, the need for the switch operation may be eliminated and the shift decision unit 101 may look for a predetermined shift map for vehicle speeds, engine rotational speed, the degrees of throttle opening and/or the like to make an automatic determination.

At step S2, for the shift control conforming to the shift request received in step S1, the first control unit 110 controls driving of the shift motor 78 for movement to the full disengagement position as a target position. Then, the flow goes to step S3. It is determined at step S3 whether or not a position output by the shift spindle position sensor 88 reaches the full disengagement position which is the designated target position. If the full disengagement position is reached, the target position for the spindle position is updated and set to the middle-capacity position, and then the flow goes to step S4. If the full disengagement position is not reached, the flow goes back to step S2 to cause the first control unit 110 to continue the driving control.

At step S4, the drive control unit 123 of the second control unit 120 controls driving of the shift motor 78 for movement to the designated middle-capacity position as a target position, and then the flow goes to step S5. It is determined at step S5 whether or not a position output by the shift spindle position sensor 88 has reached the middle-capacity position which is the target position, and also the clutch engagement at the middle-capacity position has been completed (convergence determination). If the clutch engagement has been completed, the target position for the spindle position is updated and set to the neutral position step and then the flow goes to step S6. If the clutch engagement is not completed, the flow goes back to step S4 to cause the drive control unit 123 to continue the driving control and the convergence determination in the subsequent step S5.

Figure 8:
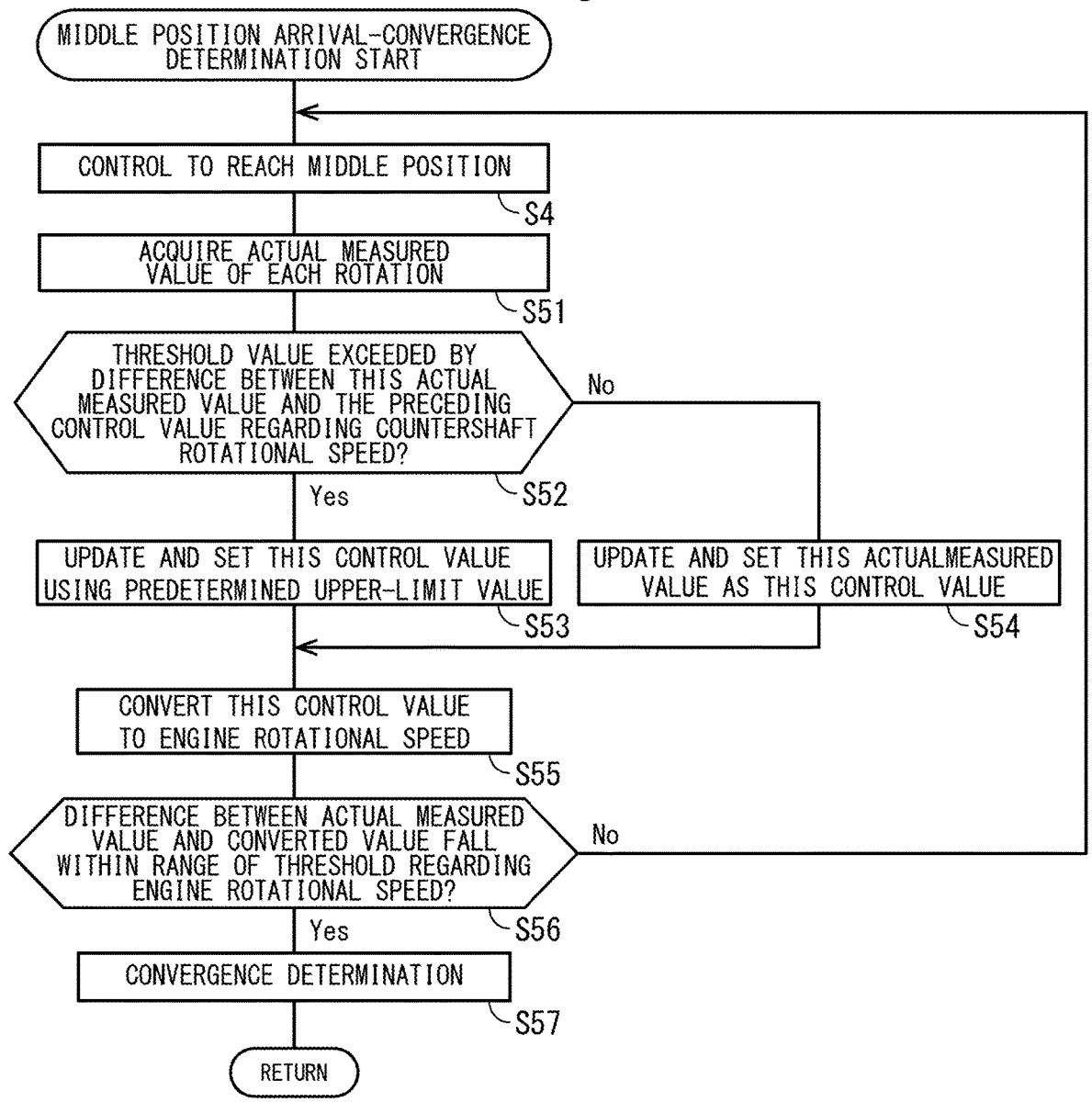
FIG. 8 is a flowchart giving a detailed explanation of the convergence determination in step S5 in FIG. 7.

FIG. 8 is a flowchart giving a detailed explanation of the convergence determination in step S5 in FIG. 7. FIG. 8 shows details of step S5 in FIG. 7 as well as the driving control in step S4 performed in parallel. That is to say, step S4 in FIG. 8 is the same as step S4 in FIG. 7 and step S5 in FIG. 7 is shown in more detail as steps S51 to S57 in FIG. 8. FIG. 8 will be described below.

Step S4 in FIG. 8 is identical with step S4 in FIG. 7 as described above. In step S4, the drive control unit 123 controls driving of the shift motor 78 for movement to the middle-capacity position as a target position at a current time i (i=1, 2, . . . ), and then the flow goes to step S51. At step S51, a countershaft rotational speed CTR(i) and an engine rotational speed Ne(i) are acquired, the countershaft rotational speed CTR(i) being output as an actual measured value from the countershaft rotational speed sensor 144 at current time i (i=1, 2, . . . ) and the engine rotational speed Ne(i) being output from the engine rotational speed sensor 143. Then, the flow goes to step S52.

At step S52, the control rotational speed calculation unit 121 determines whether or not a difference obtained by subtracting the countershaft rotational speed CTC(i−1) of the preceding (the previous time i−1) control value from the countershaft rotational speed CTR(i) of the actual measure value in this time (current time i) exceeds a rate limit set value TH as a determination threshold value (whether or not the following inequality (1) holds). If the difference exceeds, the flow goes to step S53, but if the difference does not exceed, the flow goes to step S54.

$$CTR(i)-CTC(i-1)>TH \tag{1}$$

At step S53, as expressed by the following equation (2), the control rotational speed calculation unit 121 adds the rate limit set value TH as a threshold value of the above inequality (1) to a value of the countershaft rotational speed CTC(i−1) for the preceding control, and the control rotational speed calculation unit 121 sets the sum of this addition as a value of the countershaft rotational speed CTC(i) for this control.

Then, the flow goes to step S55.

$$CTC(i)=CTC(i-1)+TH \tag{2}$$

At step S54, as expressed by the following equation (3), the control rotational speed calculation unit 121 sets the countershaft rotational speed CTR(i) of the actual measured value in this time as a value of the countershaft rotational speed CTC(i) for this control. Then, the flow goes to step S55.

$$CTC(i)=CTR(i) \tag{3}$$

As described above, "cases" are used in step S52 to cause the flow to branch to steps S53, S54. In this respect, the "case" of going to step S53 corresponds to the case where it is determined that the actual measured value CTR(i) of the countershaft rotational speed at current time i has suffered from instantaneous variations due to the effect of torsion occurring on the downstream side in the drive system and/or the like. Therefore, Equation (2) is used to find a control value CTC(i) as a value cleared of the variations. The "case" of going to step S54 corresponds to the case where it is determined that there is no variations, and therefore Equation (3) is used to adopt the actual measured value CTR(i) as a control value CTC(i) without any change.

Here, the rate limit set value TH is used in "cases" in step S52 using Inequality (1) and also used for updating the control value CTC(i) in step S53 using Equation (2), and in one embodiment this rate limit set value TH may be preset as a predetermined value in relation to a gear position at current time point i, or a target shift position in which the clutch engagement is to be completed. In this connection, a rate limit set value TH may be set in advance in such a manner as to correspond to a predetermined upper limit of conceivable vehicle acceleration in relation to a gear position. In the present invention, by use of the rate limit set value TH, if a change in rotational speed in step S52 is a change exceeding such a conceivable upper limit of vehicle acceleration, it is estimated that the countershaft rotational speed CTR(i) as an actual measured value is affected by unexpected variations in rotational speed, and a rotational speed cleared of these effects is estimated in step S53.

In step S55, the determination unit 122 uses the control rotational speed CTC(i) obtained in the nearest step S53 or S54 to find the engine rotational speed converted-value Ne[conversion](i) from the following equation (6), and then the flow goes to step S56.

$$Ne[\text{conversion}](i) = CTC(i) \times \text{RatioGearposTar} \times \text{RatioPrim} \quad (6)$$

where RatioGearposTar is a target gear position ratio, and RatioPrim is a primary gear ratio in Equation (6).

At step S56, a difference is obtained by subtracting the engine rotational speed Ne[conversion](i) as a converted value of the countershaft rotational speed CTC(i) for control obtained in the nearest step S55 from the engine rotational speed Ne(i) as the actual measured value obtained in the nearest step S51, and it is checked whether or not this difference is equal to or less than a predetermined threshold value TH2, or the following inequality (7) holds. If the inequality (7) holds, the flow goes to step S57. If the inequality (7) does not hold, the flow goes back to step S4. It is noted that, after returning to step S4, the time is updated from current time i to the subsequent time i+1, and then the processing as described above is repeated for the subsequent time i+1.

$$Ne(i) - Ne[\text{conversion}](i) \leq TH2 \quad (7)$$

It is noted that the determination in step S56 is made after it has been determined that the spindle position has reached the middle-capacity position through the driving control by the drive control unit 123. While the spindle position does not reach the middle-capacity position, the flow may be configured to return from step S56 to step S4 at all times. Further, in Equation (6) and Inequality (7), the conversion to engine rotational speed is performed to make the convergence determination (determination that a difference is equal to or less than threshold value TH2). This determination translates to a determination whether a countershaft rotational speed CTC(i) for control agrees with a mainshaft rotational speed (=Ne(i)/RatioPrim) at current time i with consideration given to a reduction ratio by a target gear position ratio RatioGearPosTar.

At step S57, as a result of the determination in the nearest step S56, the determination unit 122 outputs a convergence determination that rotational speeds of the mainshaft and the countershaft have agreed with each other at the middle-capacity position (with consideration given to a reduction ratio). Then, the target position for the spindle position is updated and set to the neutral position which is the completion position of the shift operation. After that, the flow ends in FIG. 8 and returns to FIG. 7 to proceed from step S5 to step S6.

At step S6, the third control unit 130 controls driving of the shift motor to movement for the neutral position as the target position, and then the flow goes to step S7. It is determined at step S7 whether or not a position output by the shift spindle position sensor 88 reaches the neutral position which is the designated target position. If the neutral position is reached, the flow ends in FIG. 7. If the neutral position is not reached, the flow returns to step S6 to cause the third control unit 130 to continue the driving control until the neutral position is reached.

Figure 9:
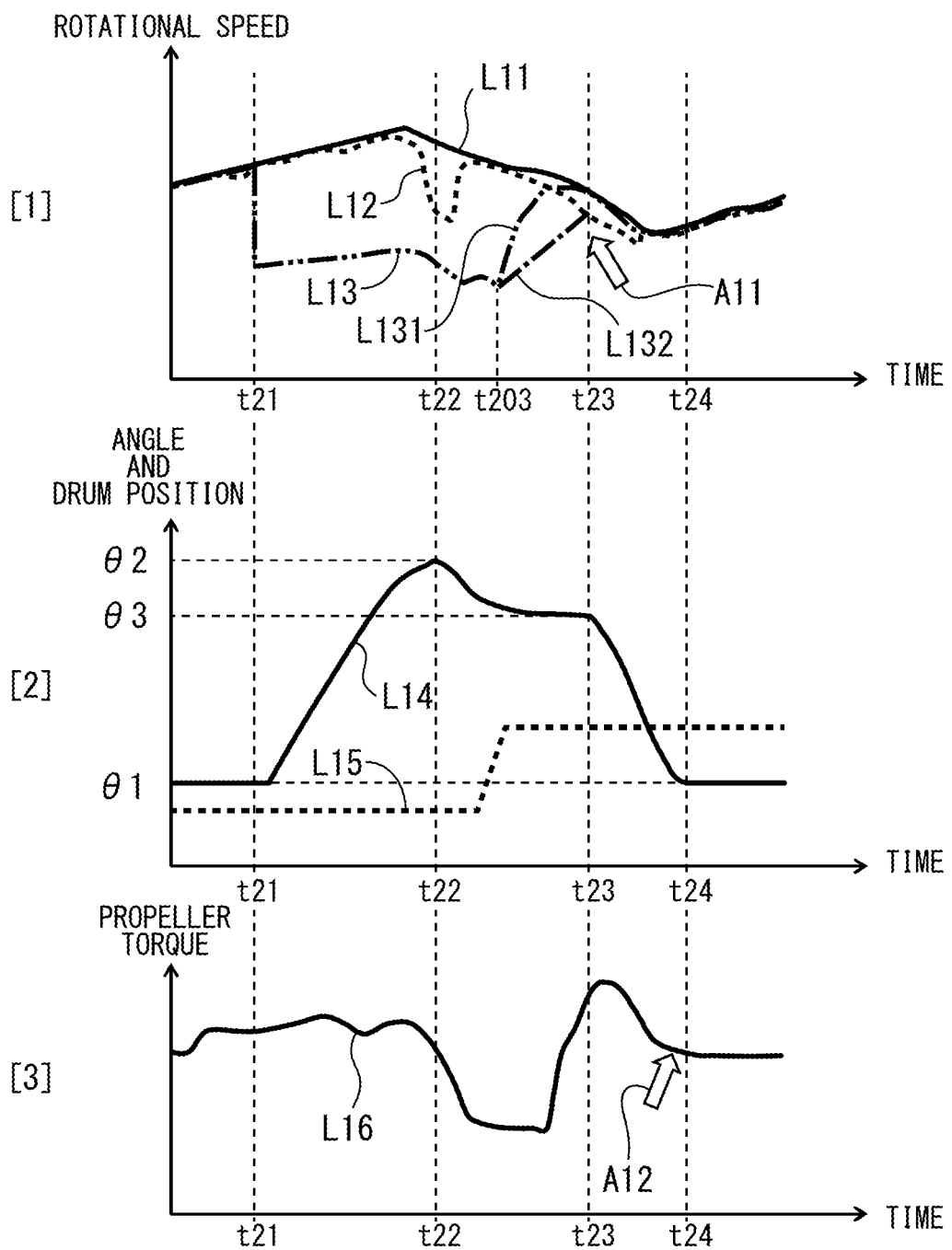
FIG. 9 is a representation for describing the advantageous effects of the clutch engagement control of the clutch engagement control system on the basis of the flows in FIG. 7 and FIG. 8 as described above.

FIG. 9 is a representation for describing the advantageous effects of the clutch engagement control of the clutch engagement control system 100 (particularly, the second control unit 120) on the basis of the flows in FIG. 7 and FIG. 8 as described above. FIG. 9 shows a schematic example of application of the clutch engagement control system 100, the schematic example corresponding to the example in FIG. 2. Specifically, time-line charts shown by [1] to [3] of FIG. 9 correspond to [1] to [3] of FIG. 2. Solid line L11 shown in [1] is a graph of engine rotational speed, dotted line L12 is a graph of rotational speed of the first shaft (mainshaft) and two-dot chain line L13 is a graph of rotational speed of the second shaft (countershaft). Solid line L14 shown in [2] is a graph of a spindle angle changed in step with the shift operation, and dotted line L15 is a graph of a shift-drum angle. Solid line L16 shown in [3] is a graph of propeller torque.

Figure 2:
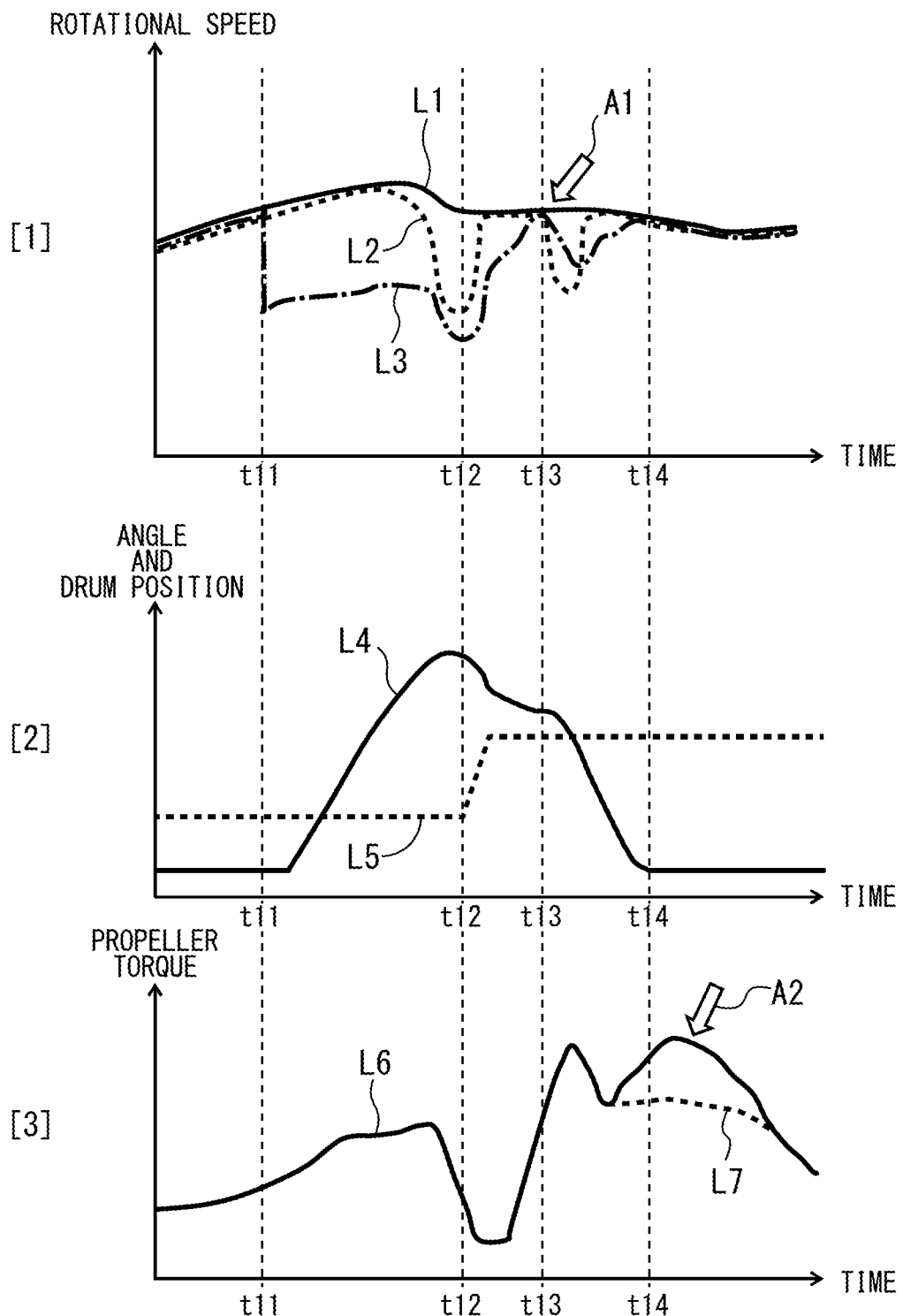
FIG. 2 is a representation showing a schematic example for describing a problem in the conventional techniques.

Further, times t21 to t24 in FIG. 9 correspond respectively to times t11 to t14 in FIG. 2. Time t21 is a time at which a second-to-third gear upshift instruction is received. Time t22 is a time at which the shift spindle is rotated to reach the full disengagement position after the instruction has been received. Time t23 is a time at which it is determined that rotational speeds of the first shaft and the second shaft have agreed with each other. And, time t24 is a time at which the clutch engagement is completed.

Specifically, for the duration from time t21 to time t22, the shift spindle is driven from neutral position θ1 shown in [2] to full disengagement position θ2 shown in [2] by the first control unit 110. For the duration from time t22 to time 23, the shift spindle is driven from full disengagement position θ2 to middle-capacity position θ3 by the second control unit 120. And also, at time t23, the convergence determination is made. For the duration from time t23 to time t24, the shift spindle is driven from middle-capacity position θ3 to neutral position θ1 by the third control unit 130. As a result, at time t24, an upshift from second gear to third gear is completed.

In FIG. 9, an advantageous effect of the clutch engagement control system 100 according to the present invention can be seen from a region from time t203 onward shown in [1]. Time t203 is a time at which a decision from step S52 to step S53 in the flow in FIG. 8 is made for the first time in the second control unit 120, that is, a time at which the decision that a rate limit set value TH is used to update a control rotational speed CTC(i) is made for the first time. After that, until time t23, the decision is maintained. Line L13 represents a change in countershaft rotational speed, and line L13 is shown as a two-dot chain line from time t22 to time 203 to denote the control rotational speed CTC(i) and the actual measured rotational speed CTR(i) which agree with each other. On the other hand, from time t203 to time t24, line L13 is shown as a dot-dash line L132 to denote the control rotational speed CTC(i) and also line L13 is shown as a two-dot chain line L131 to denote the actual measured rotational speed CTR(i).

Here, while the actual measured rotational speed CTR(i) shown by two-dot chain line L131 exhibits behavior that suddenly increases due to torsion in the drive system and/or the like, rotational speed cleared of the effect is estimated in the control rotational speed CTC(i) shown by dot-dash line L132, the control rotational speed CTC(i) being restricted from increasing beyond the vehicle upper-limit acceleration by the rate limit set value TH in the present invention. As a result, as shown by arrow A11, at time t23, the convergence determination is made that the control countershaft rotational speed indicated by dot-dash line L132 and the mainshaft rotational speed indicated by dotted line L12 agree with each other, and therefore the decision is made that the clutch engagement state is moved from the middle-capacity position to the neutral position.

Accordingly, in the present invention, when an actual measured rotational speed CTR(i) is suddenly changed by torsion in the drive system and/or the like, a convergence determination is not made accidentally ahead of a proper time point as is done in the conventional techniques. And, in the present invention, a convergence determination is made at appropriate timing to implement smooth clutch engagement control. Further, as shown by arrow A12 in [3] of FIG. 9, a torque change around time t24 is smooth, so that it is possible to minimize a torque change that makes an occupant feel uncomfortable as shown by arrow A2 of FIG. 2 describing the conventional techniques.

REFERENCE SIGNS LIST

1 . . . vehicle,
E . . . engine,
WR . . . drive wheel,
TM . . . transmission,
42, 52 . . . first shaft,
54 . . . second shaft,
53 . . . shift clutch,
144 . . . second rotational speed detector,
121 . . . control rotational speed calculation unit,
143 . . . first rotational speed detector

The invention claimed is:

1. A clutch engagement control system controlling a shift clutch in a vehicle comprising a transmission and the shift clutch, the transmission being arranged between an engine and a drive wheel, the shift clutch being arranged between the engine and the transmission to engage and disengage transmission of a rotational drive force between a first shaft on the engine side and a second shaft on the drive wheel side,
wherein the clutch engagement control system includes:
a second rotational speed detector detecting a second shaft rotational speed; and
a control rotational speed calculation unit for setting a control value of the second shaft rotational speed without exceeding a predetermined upper limit when a change of the detected second shaft rotational speed exceeds the predetermined upper limit, and for setting the detected value of the second shaft rotational speed as the control value of the second shaft rotational speed when the change of the detected second shaft rotational speed does not exceed the predetermined upper limit, and
the shift clutch is controlled based on the set control value of the second shaft rotational speed.

2. The clutch engagement control system according to claim 1,
wherein the control rotational speed calculation unit sets the control value of the second shaft rotational speed at each time point in order to update the control value of the second shaft rotational speed at each time point,
when a predetermined value is exceeded by a difference between the second shaft rotational speed detected at a current time point and a control value of the second shaft rotational speed updated at a preceding time point preceding the current time point, the control rotational speed calculation unit adds the predetermined value to the control value of the second shaft rotational speed updated at the preceding time point, and then the control rotational speed calculation unit assumes a sum of the addition to be the control value of the second shaft rotational speed updated at the current time point, and
when the predetermined value is not exceeded by the difference, the control rotational speed calculation unit assumes the value of the second shaft rotational speed detected at the current time point to be the control value of the second shaft rotational speed updated at the current time point.

3. The clutch engagement control system according to claim 1, further comprising a first rotational speed detector detecting rotational speed of the first shaft,
wherein, when it is determined that the detected rotational speed of the first shaft and the updated control value of the second shaft rotational speed agree with each other in consideration of a reduction ratio between the first shaft and the second shaft, it is determined that a predetermined half clutch state is converged in the shift clutch, and therefore transition of the clutch engagement state to a next state is controlled.

4. The clutch engagement control system according to claim 2, wherein the predetermined value is a value in relation to a gear position set at the current time point in the transmission.

5. The clutch engagement control system according to claim 1, wherein the upper limit is set in relation to a predetermined upper-limit acceleration of the vehicle.

6. The clutch engagement control system according to claim 2, further comprising a first rotational speed detector detecting rotational speed of the first shaft,
wherein, when it is determined that the detected rotational speed of the first shaft and the updated control value of the second shaft rotational speed agree with each other in consideration of a reduction ratio between the first shaft and the second shaft, it is determined that a predetermined half clutch state is converged in the shift clutch, and therefore transition of the clutch engagement state to a next state is controlled.

7. The clutch engagement control system according to claim 2, wherein the upper limit is set in relation to a predetermined upper-limit acceleration of the vehicle.

* * * * *